J. PETERSON.
STORM WINDOW.
APPLICATION FILED JAN. 7, 1919.

1,416,057.

Patented May 16, 1922.

3 SHEETS—SHEET 1.

WITNESSES:
B. G. Hall.
M. R. DeLeghre

INVENTOR:
JOHN PETERSON.
BY
Paul & Paul
ATTORNEYS.

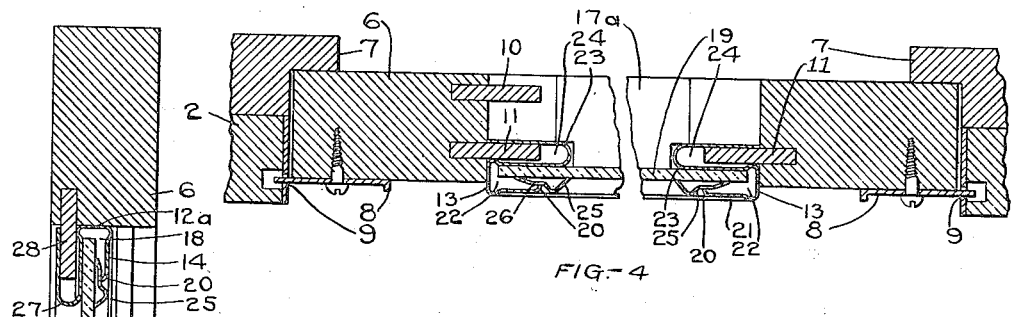
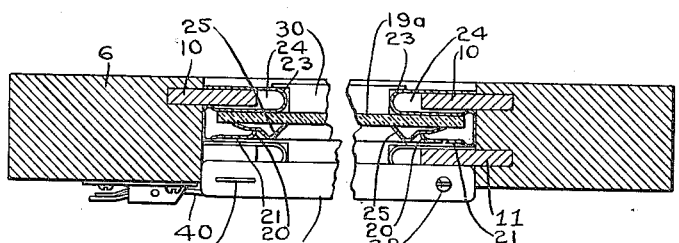
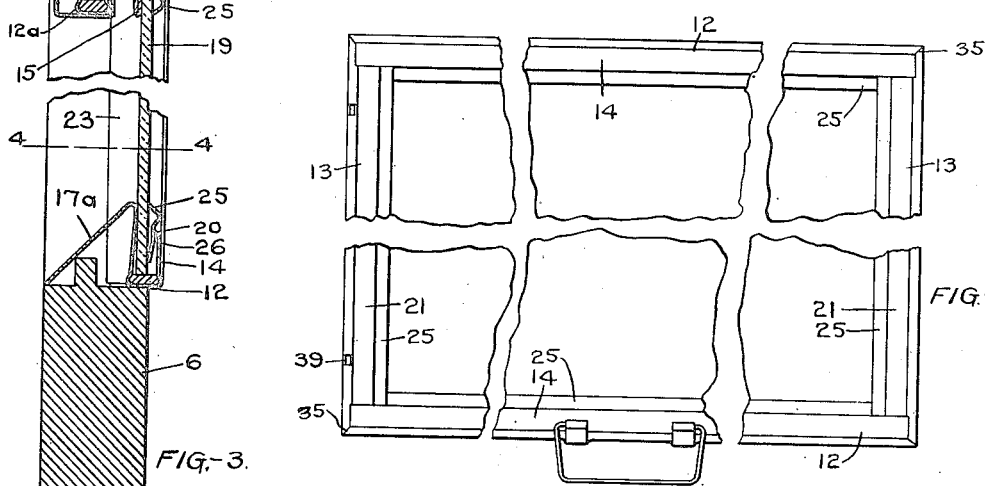
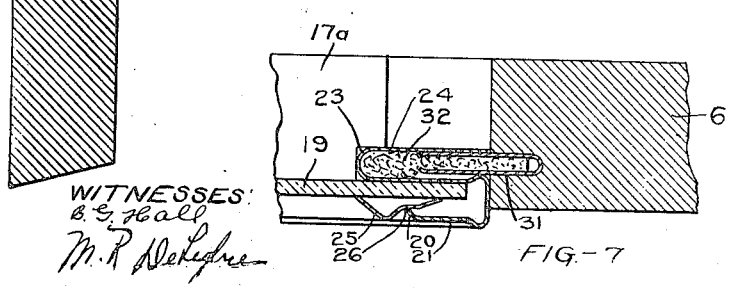

J. PETERSON.
STORM WINDOW.
APPLICATION FILED JAN. 7, 1918.
1,416,057.
Patented May 16, 1922.
3 SHEETS—SHEET 3.
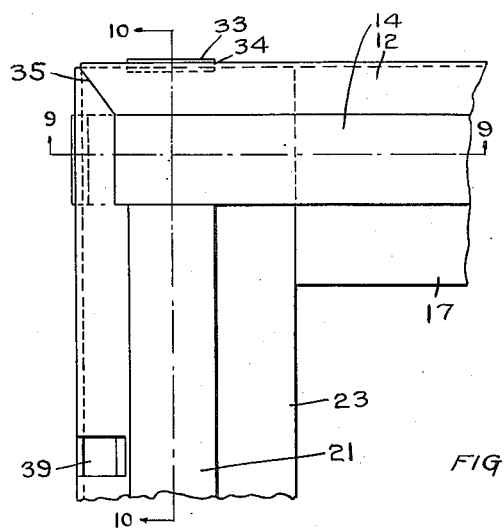
FIG.-8.
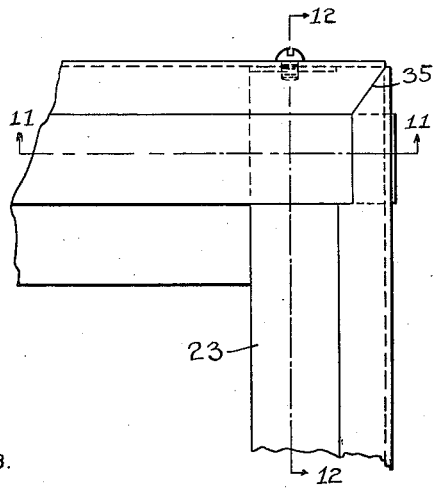
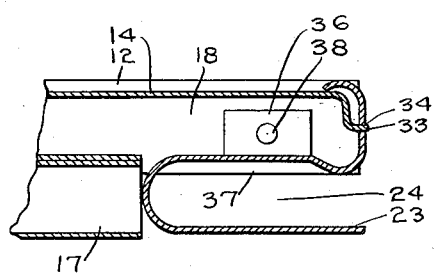
FIG.-9.   FIG.-11.
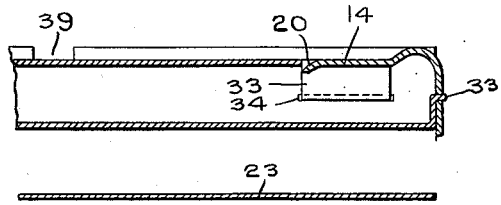
FIG.-10.
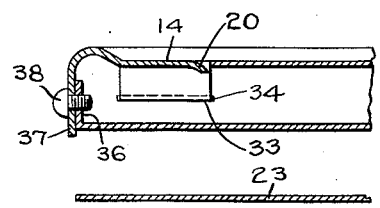
FIG.-12.
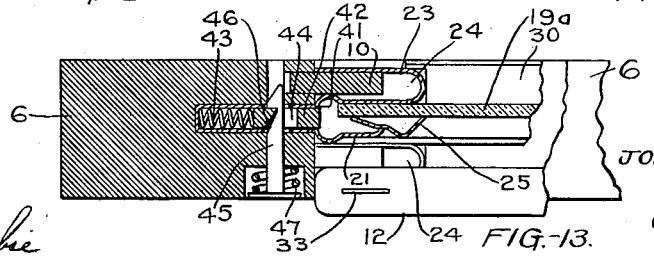
FIG.-13.
WITNESSES:
b. G. Hall
M. R. DeLeshie
INVENTOR:
JOHN PETERSON.
BY
Paul & Paul
ATTORNEYS.

UNITED STATES PATENT OFFICE.

JOHN PETERSON, OF MINNEAPOLIS, MINNESOTA.

STORM WINDOW.

1,416,057.　　　　　Specification of Letters Patent.　　Patented May 16, 1922.

Application filed January 7, 1918. Serial No. 210,657.

*To all whom it may concern:*

Be it known that I, JOHN PETERSON, a citizen of the Kingdom of Sweden, resident of Minneapolis, county of Hennepin, State of Minnesota, have invented certain new and useful Improvements in Storm Windows, of which the following is a specification.

The object of my invention is to simplify and improve the storm window shown and described in my pending application for Letters Patent of the United States, filed December 26, 1916, Serial No. 138,708.

Other objects of the invention will appear from the following detailed description.

The invention consists generally in various constructions and combinations, all as hereinafter described and particularly pointed out in the claims.

Figure 1:
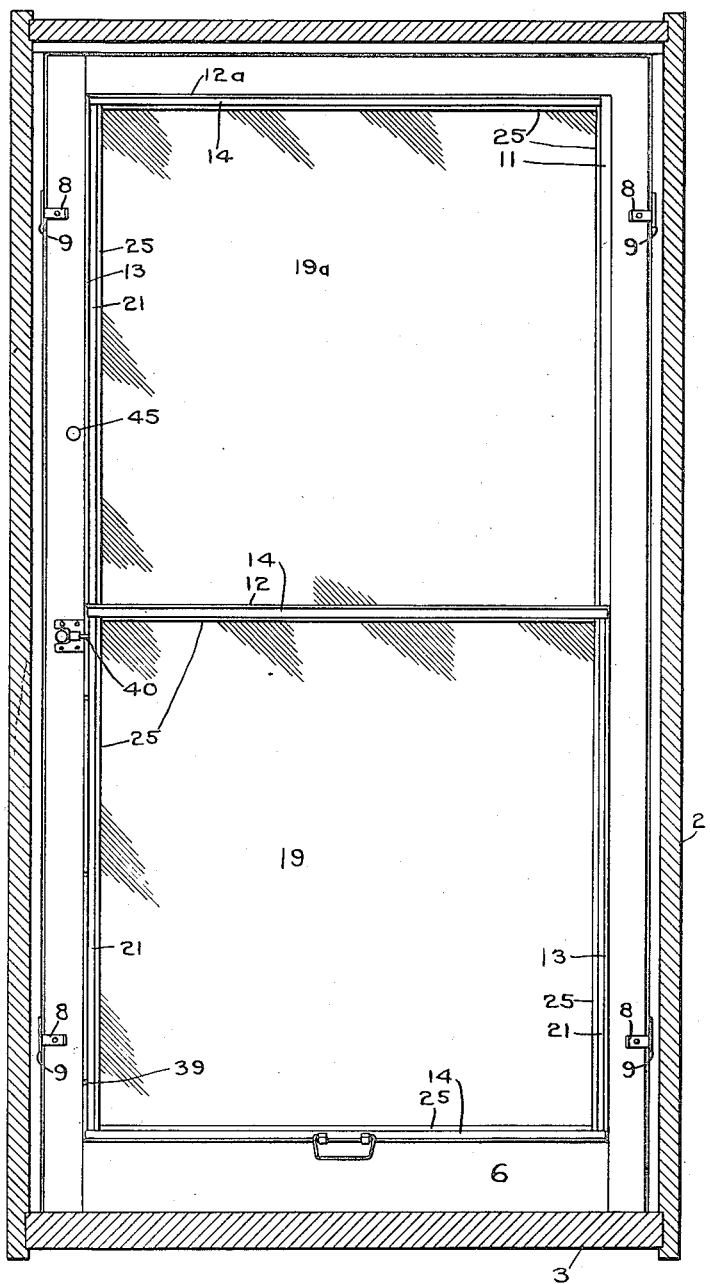
Figure 2:
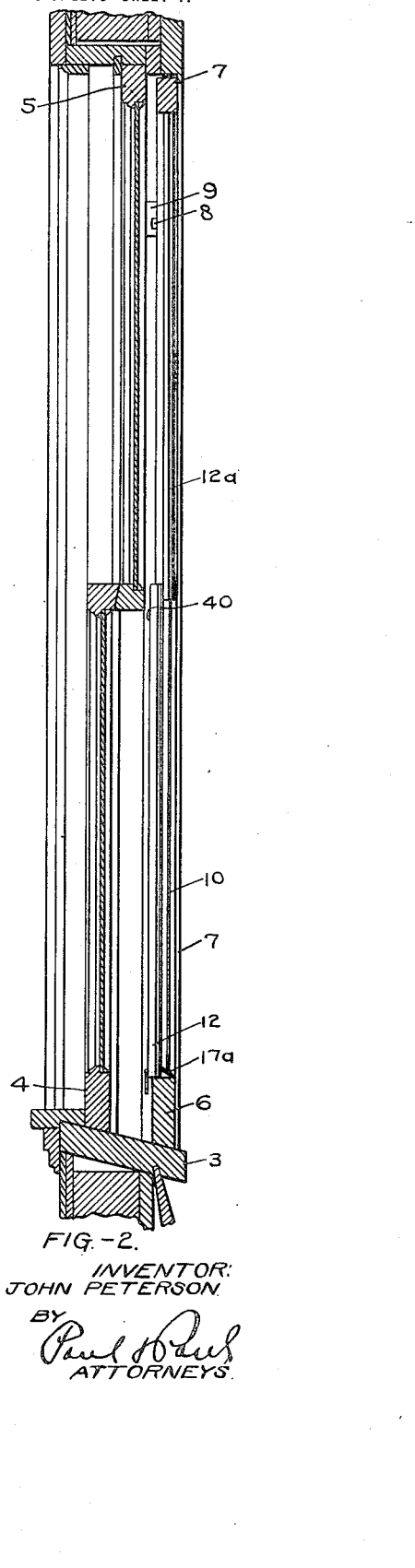

In the accompanying drawings forming part of this specification,

Figure 1 is a vertical sectional view through a window frame, showing my improved storm sash in place, Figure 2 is a vertical sectional view taken on a line at right angles substantially to the section line of Figure 1, Figure 3 is a detail sectional view of the storm sash, Figure 4 is a sectional view on the line 4—4 of Figure 3, Figure 5 is a sectional view on the line 5—5 of Figure 3, Figure 6 is an inside view of the storm sash, Figure 7 is a detail sectional view, showing a modified form of guide for the sash, Figure 8 illustrates the manner of securing the rails in which the glass of the storm sash is mounted together, Figure 9 is a sectional view on the line 9—9 of Figure 8, Figure 10 is a sectional view on the line 10—10 of Figure 8, Figure 11 is a sectional view on the line 11—11 of Figure 8, Figure 12 is a sectional view on the line 12—12 of Figure 8, Figure 13 is a detail sectional view, showing the means for locking the upper portion or section of the storm sash.

In the drawing, 2 represents a window frame having the usual sill 3 and the inside window sections 4 and 5. 6 represents the frame of the storm sash, which is inserted into the window from the inside and seated against flanges or ribs 7 provided on the window frame and locked therein by means of buttons 8 mounted on the storm sash and adapted to enter slotted plates 9 provided in the window frame. Thus the storm sash is securely locked against opening from the outside.

The storm sash is provided with oppositely arranged strips 10 and 11 extending vertically in the side rails of the storm sash and on these guiding strips the metal frames of the storm sash are adapted to slide vertically. These frames are composed of top and bottom rails 12 and side rails 13. The rails 12 have one edge inwardly turned to form a flange 14 and the opposite edge is correspondingly turned to form a flange 15 and a loop portion 17, and between the flanges 14 and 15 a recess 18 is provided into which the edge of the glass 19 is inserted, with one face seated against the flange 15 and its opposite face adjacent an inwardly turned lip 20 of the flange 14. The lower rail is correspondingly formed, except that the flange 17ª instead of being turned downwardly in a plane parallel with the plate, is bent outwardly and seated on the lower rail of the sash, as shown in Figure 3, thereby forming a deflector for rain or snow. The inner portion of this flange is bent to form a yielding surface for the glass and fit snugly against it when the parts are assembled. The side rails 13 of the bottom section or frame of the sash have inwardly turned flanges 21 on one edge, forming a recess 22 to receive the edge of the glass, while the opposite edge has a loop 23 forming a recess 24 to receive the upright guide 11 on which the side rails slide in raising and lowering the lower section of the window. These side rails are provided with the inwardly turned lips 20 corresponding to those described and, for the purpose of making a tight joint between the glass and the flanges 14 and 21, I provide plates 25 of spring material having a corrugation running lengthwise thereof with a comparatively wide flange on one side to slip into the space between the glass and the flanges 14 and 21, the flanges of the plates 25 being recessed slightly at 26 to receive the edges of the flanges 14 and 21. The plates 25 are of spring material that is adapted to yield under pressure of the flanges thereon to seat the plates snugly against the surface of the glass and hold it in place in the sash. These plates will also serve as a finish for the inner edges of the rails. The upper rails of the top section of the window, which I will designate by numeral 12ª, has a loop 27 formed on one edge adapted to receive a weather strip 28 which is mounted in the upper rail of the wooden sash and effectually closes the joint at the top of the window. The bottom rail has a flange 29 which co-operates with the flange 17, the two flanges being in sliding contact with each other when the window is closed and effectually sealing the joint between the meeting rails of the window. The outer portion of the lower rail 12ª has a loop 30 formed therein against which the glass plate 19ª is seated, the plates 25 corresponding to those described with reference to the other section being interposed between this plate and the inner flanges of the rails.

In Figure 7 I have illustrated a modified form of the upright guide which consists in providing a hollow rail portion 31 seated in the upright rails of the sash and having an asbestos packing 32 therein and adapted to enter the loop 23 formed by the outer flange of the side rails.

In Figures 8 to 12 inclusive I have illustrated the preferred manner of assembling the metal rails in which the plates of glass are mounted, which consists in providing tongues 33 on the ends of the rails to enter narrow slots 34 in the abutting rails, the rail ends being mitered and fitted together, as shown at 35, to form a right angled corner to the frame. At one corner a lip 36 is provided adapted to lap by a corresponding lip 37 and a screw 38 is passed through these lips for securing the rails together. This greatly simplifies the construction of the frame and reduces its cost of manufacture. The side rails are provided on one side with notches 39 to receive latches 40 mounted on the side rails of the wooden sash so that the lower section of the glass and its frame may be raised and locked at different elevations. I also prefer to provide one of the side rails with an opening 41 to receive a locking bolt 42 normally held therein by a spring 43. This bolt has an opening 44 therein and a pin 45 is adapted to enter said opening and has a beveled surface 46 for engaging one wall of said opening for the purpose of withdrawing the bolt when the pin is pressed inwardly against the tension of a spring 47. By this means the sash may be securely locked.

I claim as my invention:

1. In combination with a storm sash having vertical guides in its side rails, of a sliding frame composed of metallic top and bottom and side rails, the side rails formed with slots and the other rails formed with tongues fitting in said slots, both sets of rails being formed with abutting lugs positioned at one corner of the frame, and means fastening one lug to the other.

2. In a sash, a glass-carrying frame comprising rails recessed to receive a glass-pane and formed with loops opening towards the sash to receive strips attached to the sash, and yielding plates positioned between one side of the recess for the glass-pane and the glass-pane to hold the latter in place.

3. In a sash, a glass-carrying frame comprising rails recessed to receive a glass-pane and formed with loops opening towards the sash to receive strips attached to the sash, and yielding plates positioned between one side of the recess for the glass-pane and the glass-pane, said plates being formed with recesses in which the edges of the loops of the rails are seated.

4. In a sash, the combination of upper and lower sliding frames in the sash, the meeting rails of the two sashes formed with interengaging looped portions, and the upper frame formed with a loop portion at its top rail to receive a strip projecting from the sash, and the lower frame provided at its lower rail with an outwardly and downwardly inclined flange to rest on the bottom rail of the sash when in its lowermost position.

In witness whereof, I have hereunto set my hand this 27th day of December, 1917.

JOHN PETERSON.